(12) United States Patent
Baatz et al.

(10) Patent No.: US 8,870,119 B2
(45) Date of Patent: Oct. 28, 2014

(54) MODULAR SEAT SYSTEM FOR A VEHICLE

(75) Inventors: Andreas Baatz, Sauensiek (DE);
Michael Supan, Jork (DE); Frank Klepka, Berlin (DE)

(73) Assignee: Airbus Operations GmbH, Hamburg (DE)

( * ) Notice: Subject to any disclaimer, the term of this patent is extended or adjusted under 35 U.S.C. 154(b) by 361 days.

(21) Appl. No.: 12/948,435

(22) Filed: Nov. 17, 2010

(65) Prior Publication Data

US 2011/0068226 A1    Mar. 24, 2011

Related U.S. Application Data

(63) Continuation-in-part of application No. 11/470,327, filed on Sep. 6, 2006, now Pat. No. 7,857,259.

(30) Foreign Application Priority Data

Sep. 6, 2005   (DE) ......................... 10 2005 042 403

(51) Int. Cl.
*B64D 11/06*    (2006.01)
*B64C 1/20*    (2006.01)

(52) U.S. Cl.
CPC .. *B64C 1/20* (2013.01); *Y02T 50/46* (2013.01); *B64D 2011/0644* (2013.01); *B64D 11/0696* (2013.01)
USPC ............... 244/122 R; 248/346.01; 244/118.6

(58) Field of Classification Search
USPC .................. 244/118.5, 118.6, 122 R; 296/64; 114/194; 248/429, 188.1, 346.01; 297/452.4
See application file for complete search history.

(56) References Cited

U.S. PATENT DOCUMENTS

| | | | |
|---|---|---|---|
| 3,578,274 A * | 5/1971 | Ginn et al. .................. | 244/118.6 |
| 3,652,050 A | 3/1972 | Marrujo et al. | |
| 3,785,600 A | 1/1974 | Padovano | |
| 3,893,729 A | 7/1975 | Sherman et al. | |
| 4,229,040 A | 10/1980 | Howell et al. | |
| 4,489,978 A | 12/1984 | Brennan | |
| 4,493,470 A * | 1/1985 | Engel .......................... | 248/503.1 |
| 4,881,702 A | 11/1989 | Slettebak | |
| 5,383,630 A * | 1/1995 | Flatten ....................... | 244/118.6 |
| 5,553,923 A | 9/1996 | Bilezikjian | |
| 5,558,309 A | 9/1996 | Marechal | |
| 5,673,973 A | 10/1997 | Marechal | |

(Continued)

OTHER PUBLICATIONS

German Examination Report dated Oct. 4, 2005.

*Primary Examiner* — Tien Dinh
*Assistant Examiner* — Michael Kreiner
(74) *Attorney, Agent, or Firm* — Jenkins, Wilson, Taylor & Hunt, P.A.

(57) ABSTRACT

A modular seat system for a passenger compartment of a vehicle includes at least one seat, which has a seat unit with a seating element and a seat back and a seat frame with at least one pair of essentially vertical support elements, at whose upper end a bearing structure is arranged on which the seat unit rests, a fixing structure in the floor of the passenger compartment with at least two longitudinal rails, which have a predetermined spacing from one another, for accommodating the lower ends of the support elements, and an adapter plate for the fixing of the support elements, which adapter plate is fitted to the lower end of the support elements, and is fitted in a mobile fashion to at least one support element, so that the spacing of the support elements from one another is variable independently of the width of the seat unit.

12 Claims, 12 Drawing Sheets

(56) References Cited

U.S. PATENT DOCUMENTS

| | | | |
|---|---|---|---|
| 5,827,022 A * | 10/1998 | Tovani | 410/78 |
| 5,921,629 A * | 7/1999 | Koch et al. | 297/344.1 |
| 6,219,983 B1 * | 4/2001 | Grakjaar Jensen et al. | 52/403.1 |
| 6,659,402 B1 | 12/2003 | Prochaska | |
| 8,172,195 B2 * | 5/2012 | Fanucci et al. | 248/647 |
| 2012/0193471 A1 * | 8/2012 | Turschel et al. | 244/118.6 |

* cited by examiner

MODULAR SEAT SYSTEM FOR A VEHICLE

CROSS-REFERENCE TO RELATED APPLICATIONS

This application is a continuation in part of U.S. patent Ser. No. 11/470,327, filed 6 Sep. 2006 which claims priority from German Patent Application No. DE 10 2005 042 403.1 filed on Sep. 6, 2005, the disclosures of which are incorporated herein by reference in their entireties.

The disclosed embodiments are directed to a modular seat system for a vehicle and in particular to the fixing of seats in a passenger aircraft on the cabin floor.

BACKGROUND

In the prior art, seats and other installation modules are fixed to mounting rails in the cabin floor, which generally run along the cabin. Other means of transport such as ships and coaches often also have such rails. In aircraft, standardised mounting rails—also referred to as seat rails are installed at a predetermined distance from one another, whereby this distance can differ from aircraft type to aircraft type. The individual rail usually comprises a light metal profile with an upwardly dovetailed cross-section, into which cylindrical and plate-shaped counterparts can be introduced from above through circular openings and the latter can also be fixed. By means of a small longitudinal displacement, the plate piece is trapped in the rail and can then be clamped or fixed. On the other hand, the guide pin, which engages into one of the rail openings, undertakes the positioning along the rail. Various installation modules can thus be installed in the cabin in a straightforward and reliable manner by means of the rails, for which purpose two neighbouring rails are as a rule used. In the case of passenger aircraft, it is mainly the passenger seats that are fixed in the rails in a large number. In order to satisfy the high demands on stability especially in the event of a crash, the seats have a stable sub-structure matched to the rail geometry. For this purpose, the fixing points of the seat sub-structure must match the spacings of the rail openings in the longitudinal direction and the spacing of the rails in the transverse direction.

In practice, the problem arises that such seat modules can often only be installed in quite specific types of aircraft, since the spacing of the rails from one another varies from aircraft type to aircraft type, even in the case of different types from the same manufacturer. This is especially disadvantageous for those who employ the aircraft, i.e. airlines, since the structure of the seat sub-structure is different even in the case of identical seat upholstery, which ultimately gives rise to a different seat type. The existing seats, therefore, often cannot be used when aircraft variants are introduced, which gives rise to unnecessary costs. A further consequence of this is that the seat manufacturer has to offer different seat types and the batch size is therefore reduced, as a result of which the production per unit becomes more expensive.

A modular seat system for aircraft is known from U.S. Pat. No. 6,659,402, wherein the seat has a primary seat structure and an integrated base plate, which is connected to the primary seat structure so as to be mechanically rotatable. The drawback with this prior art is the fact that the primary seat structure is mounted fixed and with predetermined dimensions on the base plate and consequently the actual seat is not sufficiently variable in its structural dimensions such that it can always ensure flexible installation in an aircraft.

SUMMARY

The object of the disclosed embodiments is to ensure the cost-effective and flexible fixing of standardised installation modules—in particular passenger seats—with different spacing of the mounting rails and thus to enable a straightforward and standardised installation of seats, even when the rail spacing in the floor of the passenger compartment varies and in particular the width of the seat unit is incompatible with the rail spacing.

This problem is solved by the modular seat system as described herein.

The idea underlying the disclosed embodiments is to fix the support elements of the seat to the bearing structure of the seat in such a way that the spacing of the support elements from one another is variable independently of the width of the seat unit.

The modular seat system according to the disclosed embodiments for a passenger compartment of a vehicle, in particular an aircraft, with at least one seat which comprises: a seat unit with a seating element and a seat back, a seat frame with at least one pair of essentially vertical support elements, at whose upper end a bearing structure is arranged on which the seat unit rests, and a fixing structure in the floor of the passenger compartment with at least two rails, which have a predetermined spacing from one another, for accommodating the lower ends of the support elements, is accordingly characterised by a spacing device, which defines the spacing between the two support elements at their upper and/or lower end, so that the spacing of the support elements from one another is variable independently of the width of the seat unit.

The modular seat system as described herein preferably has one or more of the following features:

the bearing structure comprises at least one seat brace for connecting the support elements, which brace is fitted to the upper end of the support elements, it being fitted in a mobile fashion to at least one support element, so that the spacing of the support elements from one another is variable independently of the width of the seat unit;

a bottom brace is fitted to the lower end of the support elements, it being fitted in a mobile fashion to at least one support element, so that the spacing of the support elements from one another is variable;

each support element has two fixing elements at the lower end, which are arranged one behind the other, so that they essentially form a rectangle when the seat is installed;

a second seat brace is fitted, essentially parallel to the first seat brace, in each case to the upper end of the support elements;

an adapter plate is provided for the fixing of the support elements, which adapter plate is fitted to the lower end of the support elements, it being fitted in a mobile fashion to at least one support element, so that the spacing of the support elements from one another is variable independently of the width of the seat unit;

the adapter plate comprises guide pins for the positioning of the plate and/or clamping elements for the fixing of the plate in at least one rail;

the adapter plate comprises fixing points for installation modules at the plate upper side;

the guide pins and/or the clamping elements are mounted an the plate so as to be displaceable;

the adapter plate has holes for the fitting of the guide pins and/or slots for the fitting of the clamping elements;

the spacing between the holes corresponds to the rail spacings;

at least one of the slots is arranged in the adapter plate perpendicular with respect to the rails;

the slot length substantially corresponds to half the pitch of the rail openings;

the adapter plate has at least four clamping elements and two guide pins;

the adapter plate has two clamping elements and guide pins, two or more such plates being used for the fixing of an Installation module;

the adapter plate is a light metal milled part, a plastics part or a high-strength casting;

the adapter plate has a further seat rail running at right angles to the flight direction.

An advantage of the modular seat system according to the disclosed embodiments includes, amongst other things, the fact that the installation of the group of seats can take place more cost-effectively on account of the unified modular dimensions.

BRIEF DESCRIPTION OF THE DRAWINGS

Further features and advantages of the disclosed embodiments emerge from the following description of preferred embodiments, reference being made to the appended drawings.

In the figures.

DETAILED DESCRIPTION

Figure 1:
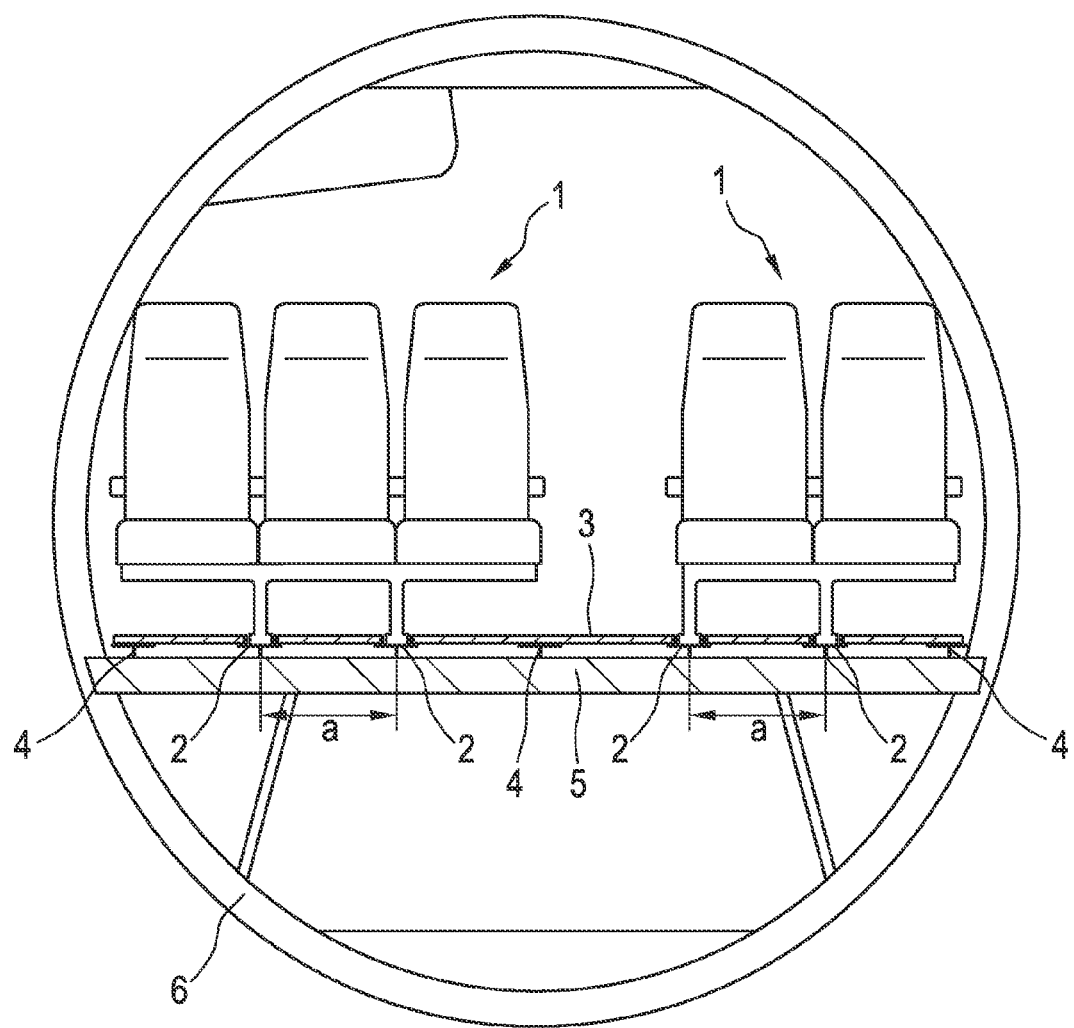
FIG. 1 shows a cross-section through the cabin of a passenger aircraft.

The representations in the drawing are not true to scale. Identical and identically working elements are provided with the same reference numbers in the figures.

The cross-section of a passenger cabin represented in FIG. 1 shows a seat arrangement with 2- and 3-seat modules 1, which are mounted on mounting rails 2. In order to support cabin floor 3, there are provided apart from rails 2 additional bearing profiles 4, which do not however assume any mounting function for cabin modules. Depending on the cabin width and aircraft type, a different distribution of the floor with rails 2 and bearing profiles 4 can thus result, and this often leads to a situation where spacing "a" of rails 2 with respect to one another varies with types of aircraft. Rails 2 and bearing profiles 4 lie an transverse spars 5, which are fixed to ribs 6. Apart from the seat modules, other elements of the cabin equipment can also be installed. Rails 2 comprise in particular a light metal profile and, in the event of a crash, must withstand the high loads from the forces due to the mass of modules 1 fixed to the rails. As mentioned above, seat modules 1 are designed for a certain rail spacing "a", so that a change in spacing requires a new seat type, and this gives rise to high costs on account of the large number of seats.

Figure 2A:
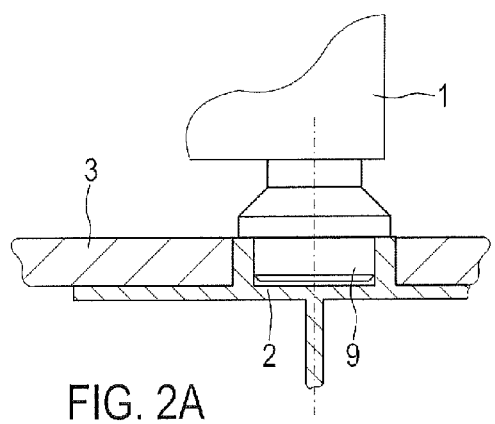
FIGS. 2A to 2D show the mode of functioning of a mounting rail.
Figure 2C:
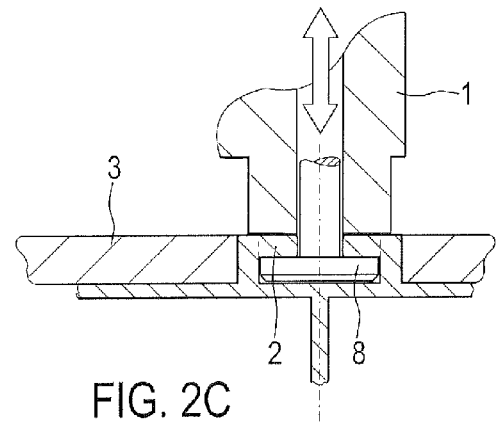
Figure 2B:
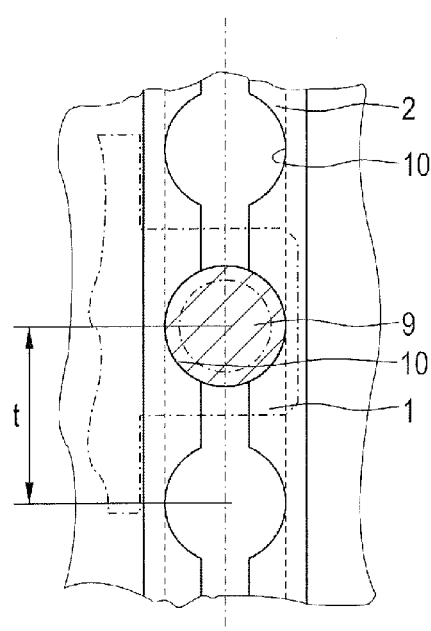
Figure 2D:
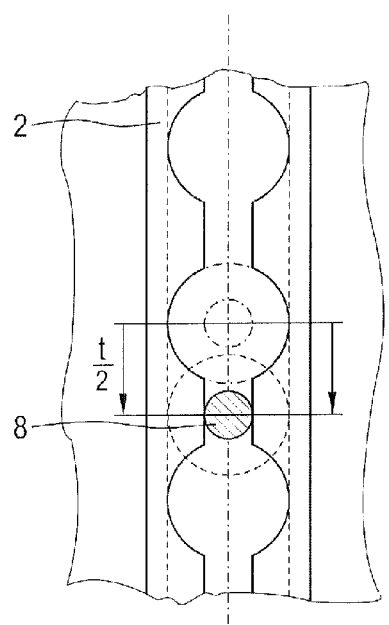

FIGS. 2A, 2B, 2C and 2D show in general the mode of functioning of a mounting rail 2 in various views. T-shaped rail profile 2 is supported on transverse spar 5 (FIG. 1), where the forces from the loading of the rails and cabin floor 3 are transmitted outwards to rib 6 (FIG. 1). The lateral flanges of rail profile 2 serve to support floor 3, whilst the dovetail-shaped upper cross-section of rail 2 is provided for the fixing of cabin module 1. FIG. 2A and FIG. 2B show the foot part of a module 1, which carries a plateshaped clamping element 8 and a cylindrical guide pin 9. Parts 8, 9 enter from above in each case into a circular rail opening 10, the positioning along rail 2 being performed by fixed pin 9. Since openings 10 are provided at regular pitches "t", the displacement by a half pitch in the case of clamping elements 8 suffices to achieve the fixing and module/rail force transmission (see FIGS. 2C and 2D). The clamping takes place for example by raising element 8, as is indicated by an arrow (FIG. 2C). A plurality of guide pins 9 and clamping elements 8 with exact foot coordinates are therefore required for the fixing of installation module 1. A change in rail spacing "a" must therefore necessarily lead to a new sub-structure of module 1.

Figure 3A:
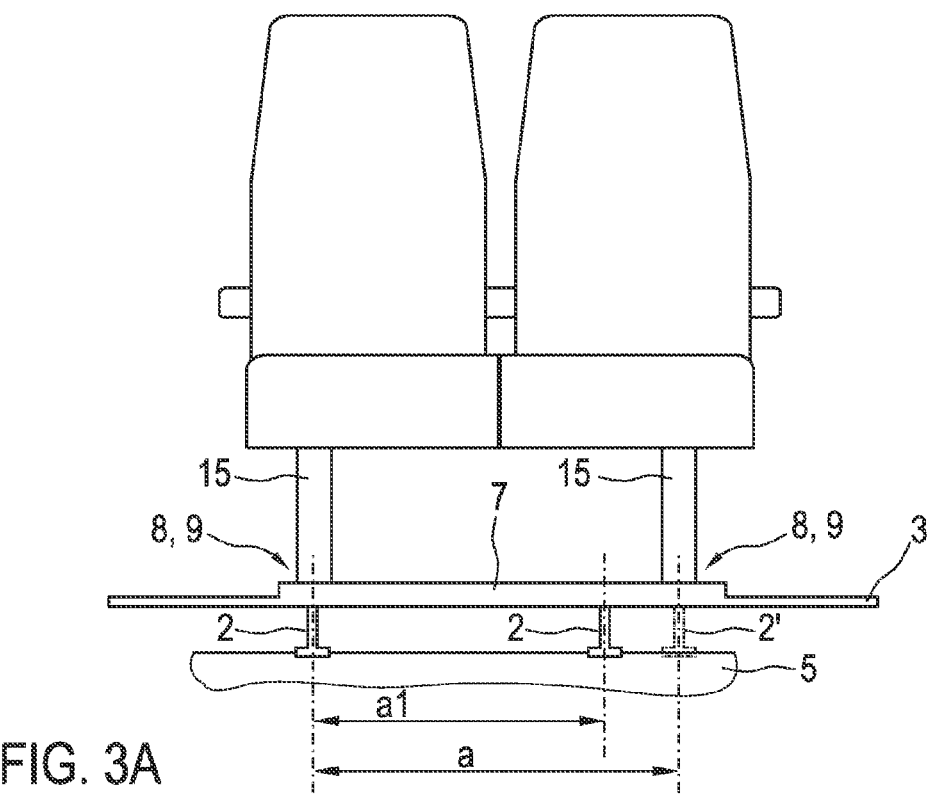
FIGS. 3A and 3B show a front view and plan view of an embodiment of the frame-like adapter plate with seat module.
Figure 3B:
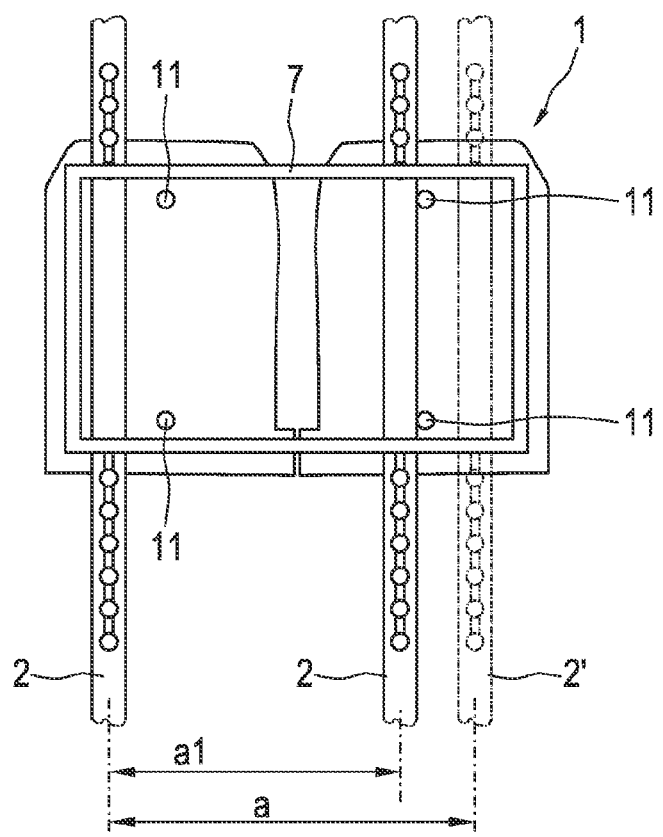

FIGS. 3A and 3B show the front view and plan view of a frame-shaped design of adapter plate 7 according to the disclosed embodiments in combination with a 2-seat module 1. Adapter plate 7 carries fixing points for clamping elements 8, 8' and guide pins 9, 9', whereby positions 8' present a variant of the fixing possibility with a rail spacing "a1". Fixing points 11 for installation module 1 are provided at the upper side of adapter plate 7. Modules 1 can thus also be mounted with matching geometry of the base connecting points with different rail spacings "a", "a1" and also off-centre. Large bending forces do not occur in adapter plate 7 an account of the adjacent position of force application points 8, 11, so that the plate has only a small overall height and can be produced in a lightweight construction. In the case of an off-centre fixing, the adapter plate must be dimensioned accordingly. Two guide pins 9 and 9' suffice for the positioning in rails 2 with the shown frame design of adapter plate 7. Four clamping elements 8 are also provided corresponding to the four fixing points 11 of depicted seat module 1. Shown frame plate 7 with the possibility of positioning on two rails 2, 2' merely represents a variant of various possible embodiments. Plates 7 can therefore readily come into consideration for more than two different rail spacings "a", "a1". Spacings "a", "a1" can be designed as fixed or individually adjustable. Moreover, instead of the frame shape, an x-shaped design is also conceivable. Accordingly, different design embodiments, e.g. in a milled design, casting, plastics etc, also come into consideration. In particular, guide pins 9, 9' and clamping elements 8, 8' can also be fitted so as to be displaceable.

Figure 4:
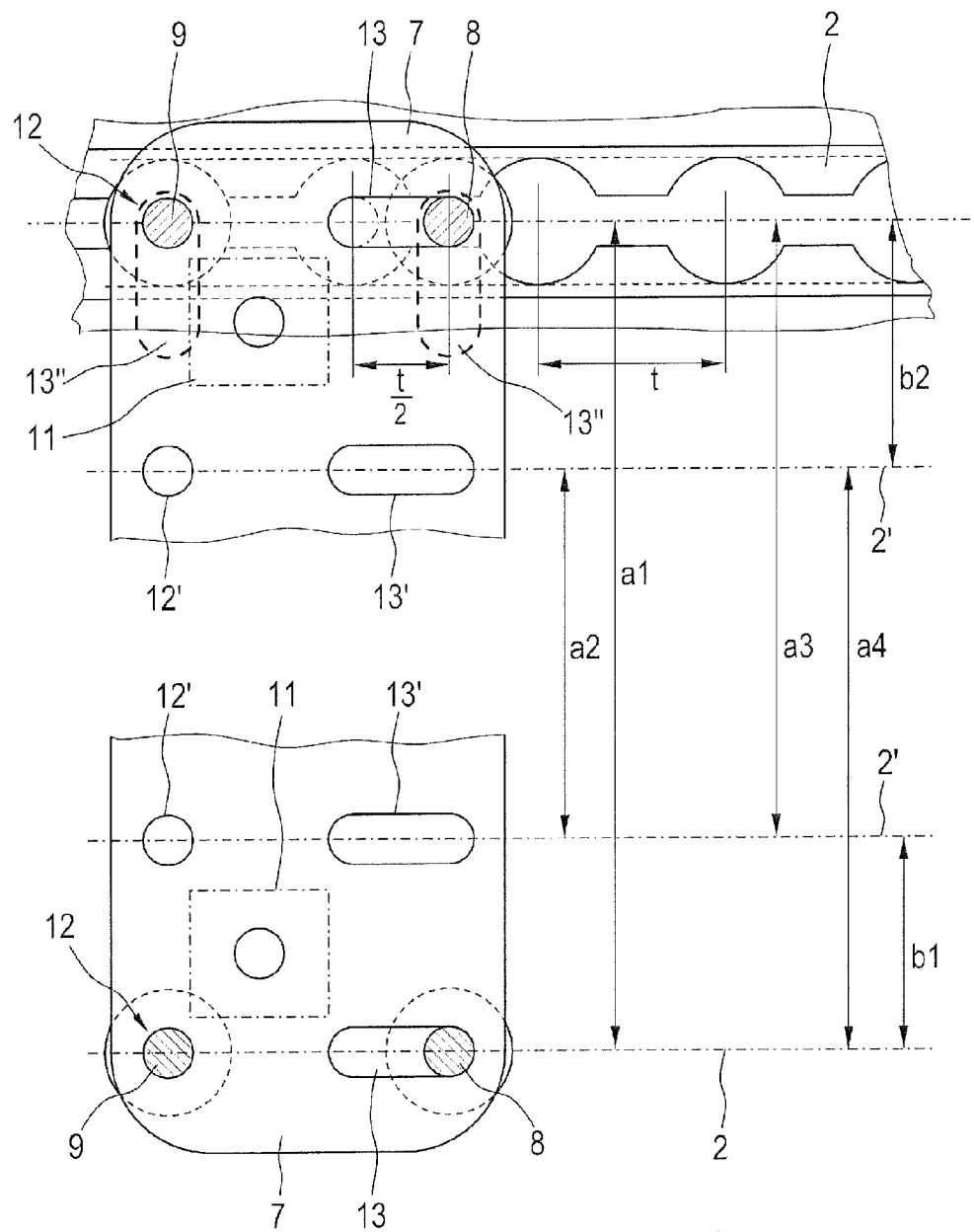
FIG. 4 shows the plan view of the adapter plate according to FIG. 3.

FIG. 4 shows a plan view of a narrow adapter plate 7. In contrast with the frame-shaped solution shown in FIG. 3, adapter plate 7 is split up here into two parts. For the example of seat module 1 shown above, the two front and rear fixing points 11 are supported in each case an a narrow adapter plate 7, which each have two clamping elements 8, 8' and guide pins 9, 9'. As a result of the geometry of the holes and slots 12, 13 with spacings "b1" and "b2", the possibility arises here of four different rail spacings "a1", . . . , "a4" being able to be bridged by a plate 7. The variable assembly of guide pins 9, 9' solely requires holes 12, 12', whilst the fitting of clamping elements 8, 8' takes place by means of slots 13, 13', 13". Slots are required, since—as explained above—clamping element 8 must first be introduced into rail 2, in order then to be shifted through half pitch "t"/2 of rail openings 10 into the clamping position. The slots can be arranged in adapter plate 7 in parallel or normal with respect to rails 2. The advantage of the narrow design of adapter plate 7 over the frame-shaped solution (see FIG. 3) lies in the saving on structure, even if more guide pins 9 are required overall.

Figure 5:
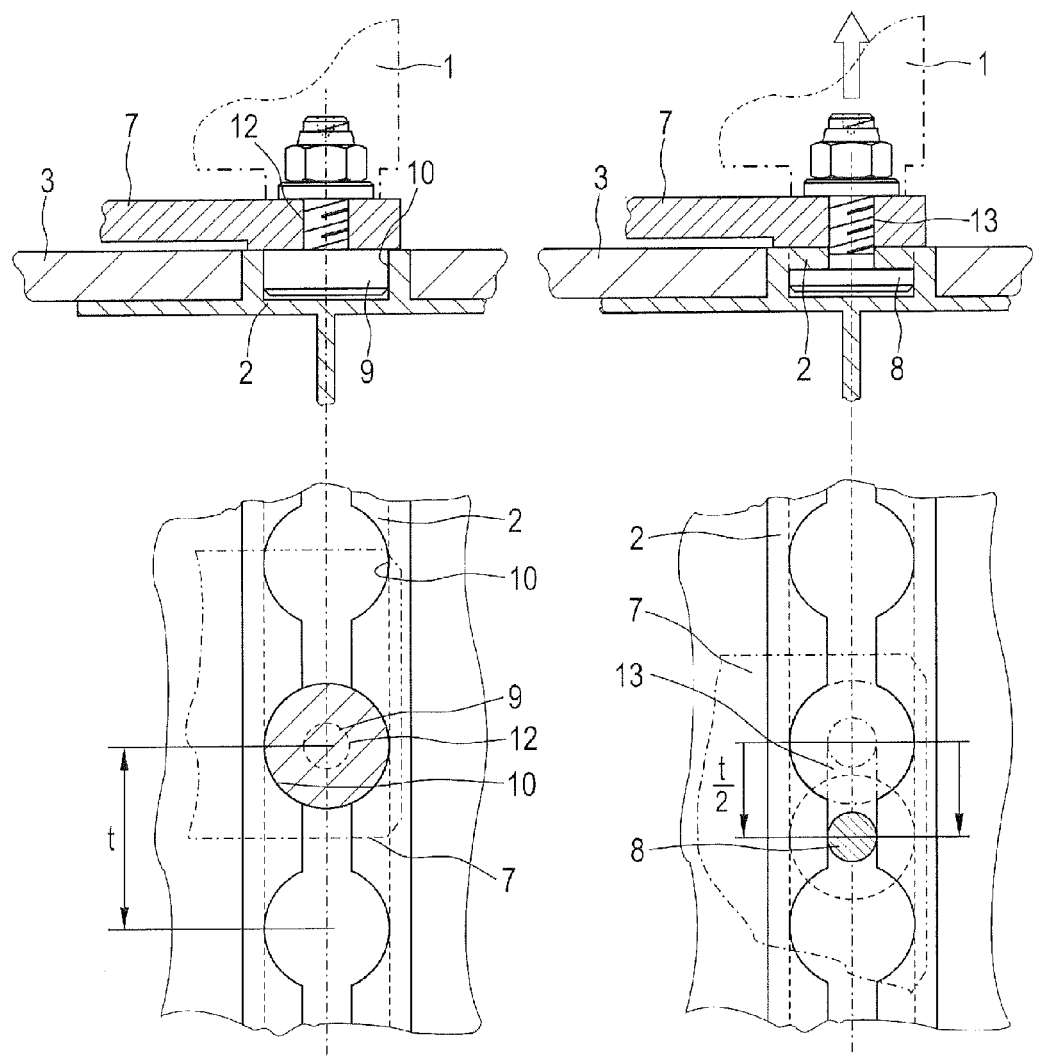
FIG. 5 shows an assembly possibility for the adapter plate and rail according to FIGS. 3 and 4.

FIG. 5 shows the possibility of assembly of adapter plate 7 and rail 2 via clamping element 8 and pin 9 by means of simple screw joints. For this purpose, the screw shanks merely need to be introduced into holes 12 and slots 13 provided for this. Adapter plate 7 is thus reliably fixed on rail 2.

Figure 6:
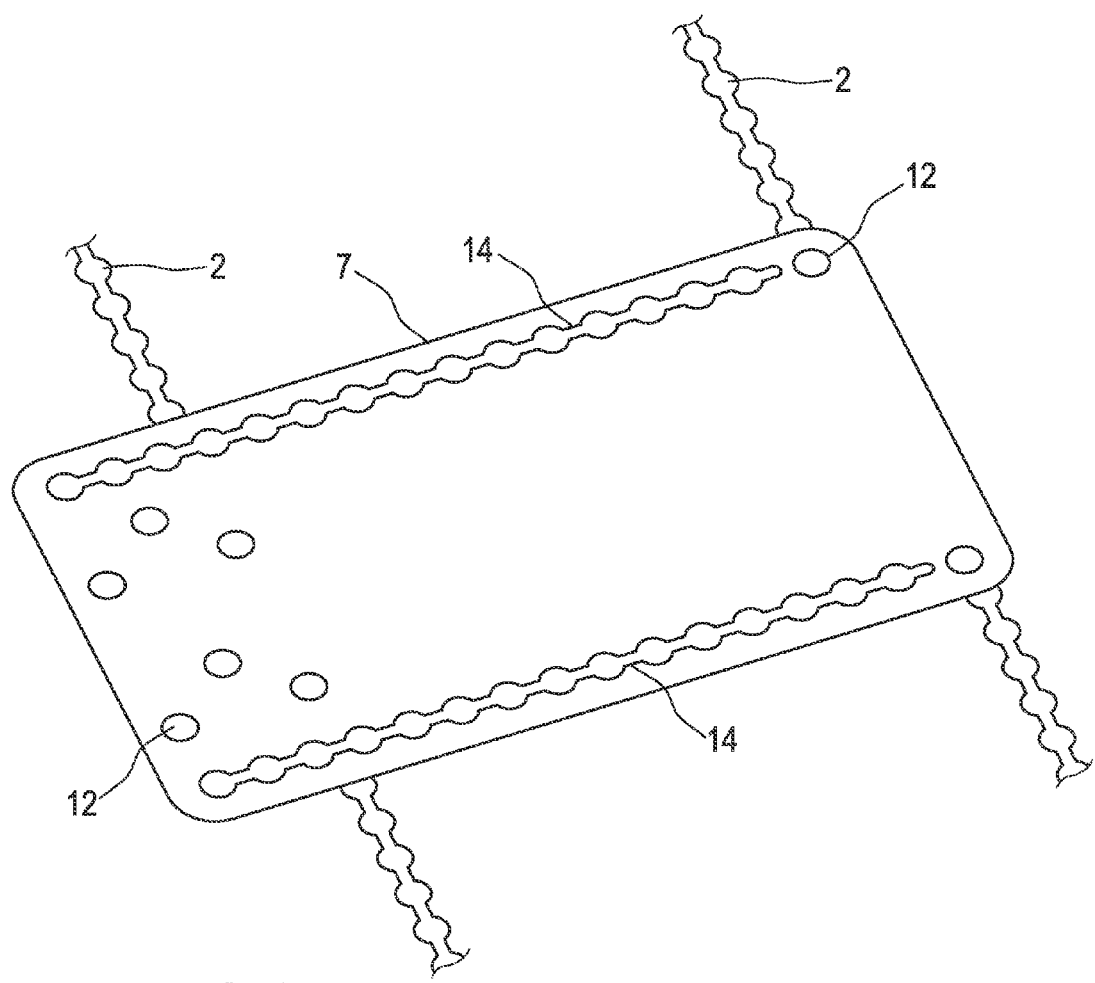
FIG. 6 shows a perspective view of a further embodiment of the adapter plate.

FIG. 6 shows an adapter plate 7 with two rails 14 running at right angles to the flight direction, which rails are integrated into adapter plate 7. This design makes it possible to select in a variable manner the spacing of adapter plate 7 from components installed fixed (aircraft side panel etc.), even when standard modules or seats are used. In this way, it can be ensured that seat rail 2 has a spacing from this component with which a module present as standard could not normally be installed. Moreover, instead of a lateral displacement, the module or the seat can be rotated both in grids and also individually about its vertical axis as a result of the design of the seat rail.

Figure 7A:
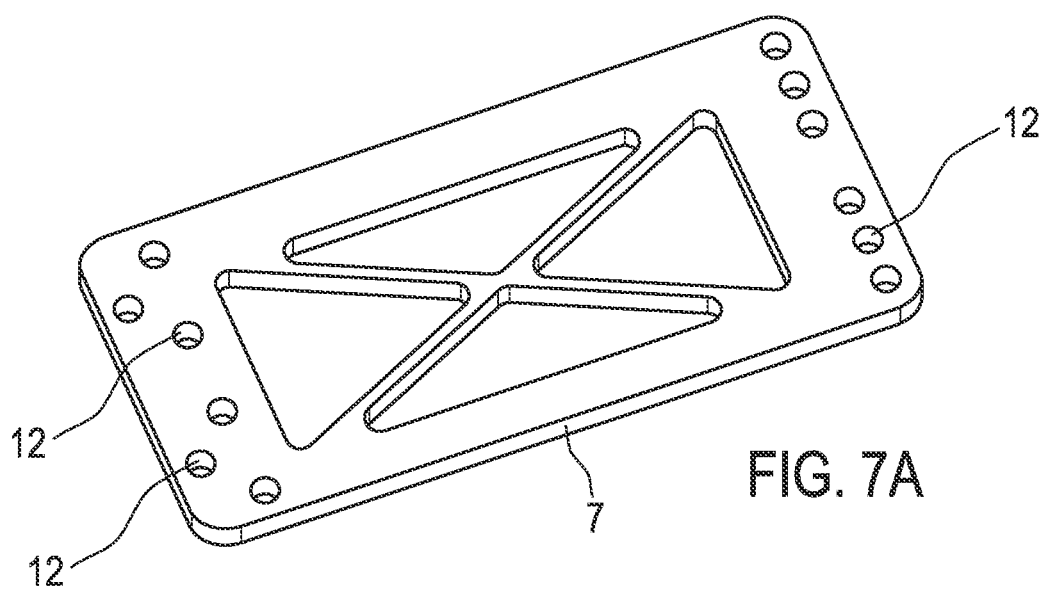
FIGS. 7A and 7B show a perspective view of further embodiment of the adapter plate.
Figure 7B:
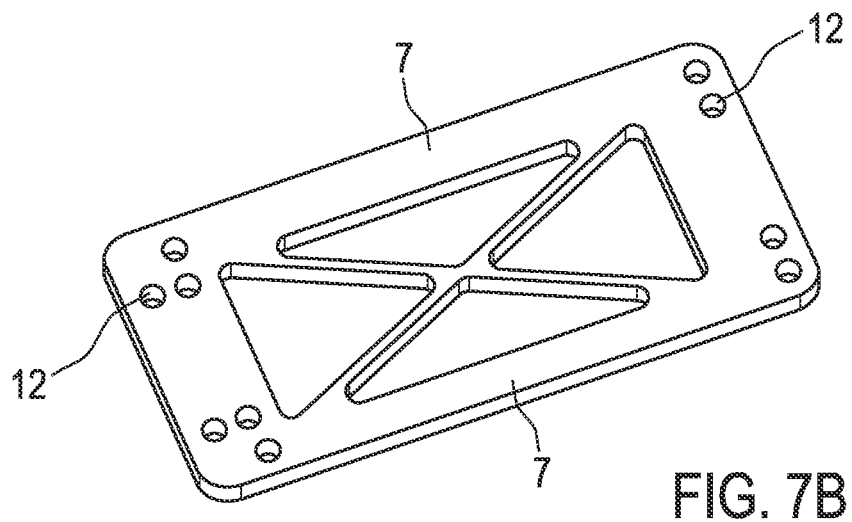

FIGS. 7A and 7B each show a perspective view of an embodiment of the adapter plate according to the disclosed embodiments. The longer edge of plate 7 is referred to as the longitudinal edge in the following, and the shorter edge of adapter plate 7 is referred to as the transverse edge. FIG. 7A shows an adapter plate 7 which has holes 12 on its right-hand side which in each case are grouped into two groups of three. Holes 12 in each of the groups of three are arranged on a straight line parallel to the transverse edge. On the left-hand side, adapter plate 7 also has two groups of three holes 12. Here, however, the holes are arranged in the form of an isosceles triangle, the apex whereof forms the middle hole which lies closest to the transverse edge of adapter plate 7. The holes on the left-hand side and on the right-hand side of adapter plate 7 are in each case arranged at the same level with respect to the longitudinal edge of adapter plate 7. Adapter plate 7 can thus be used with different spacings between mounting rails 2 (not shown). If there is a smaller spacing between mounting rails 2, holes 12 on the right-hand side of adapter plate 7 and inner holes 12 on the left-hand side of adapter plate 7 are used. If the spacing between mounting rails 2 is larger, holes 12 on the right-hand side and outer holes 12 on the left-hand side are used.

FIG. 7B shows a further embodiment of adapter plate 7, wherein holes 12 are arranged in pairs on the right-hand side on a straight line parallel to the transverse edge of adapter plate 7. On the left-hand side, holes 12 are also arranged on a line parallel to the transverse edge of adapter plate 7. The spacing of the two holes 12 on the left-hand side from the transverse edge is somewhat greater than on the right-hand side. Provided beside the two said holes 12 on the left-hand side is a further hole 12 which lies closer to the transverse edge. Holes 12 on the left-hand side form a right-angled triangle, the two right-angle sides whereof lie parallel to the longitudinal edge and transverse edge of adapter plate 7. The two sides of the triangle parallel to the transverse edge and longitudinal edge of adapter plate 7 have a greater spacing from the edge than respective third hole 12. Holes 12 on the lefthand side of adapter plate 7 lie at the same level as holes 12 on the right-hand side of adapter plate 7.

The embodiment according to FIG. 7B is particularly well suited for seats with smaller dimensions in the direction of sight of the passenger and, moreover, is easier to produce than that according to FIG. 7A.

Both embodiments according to FIG. 7A and FIG. 7B have perforations in the middle section. The material used is reduced by these perforations and there is accordingly a weight saving.

Figure 8:
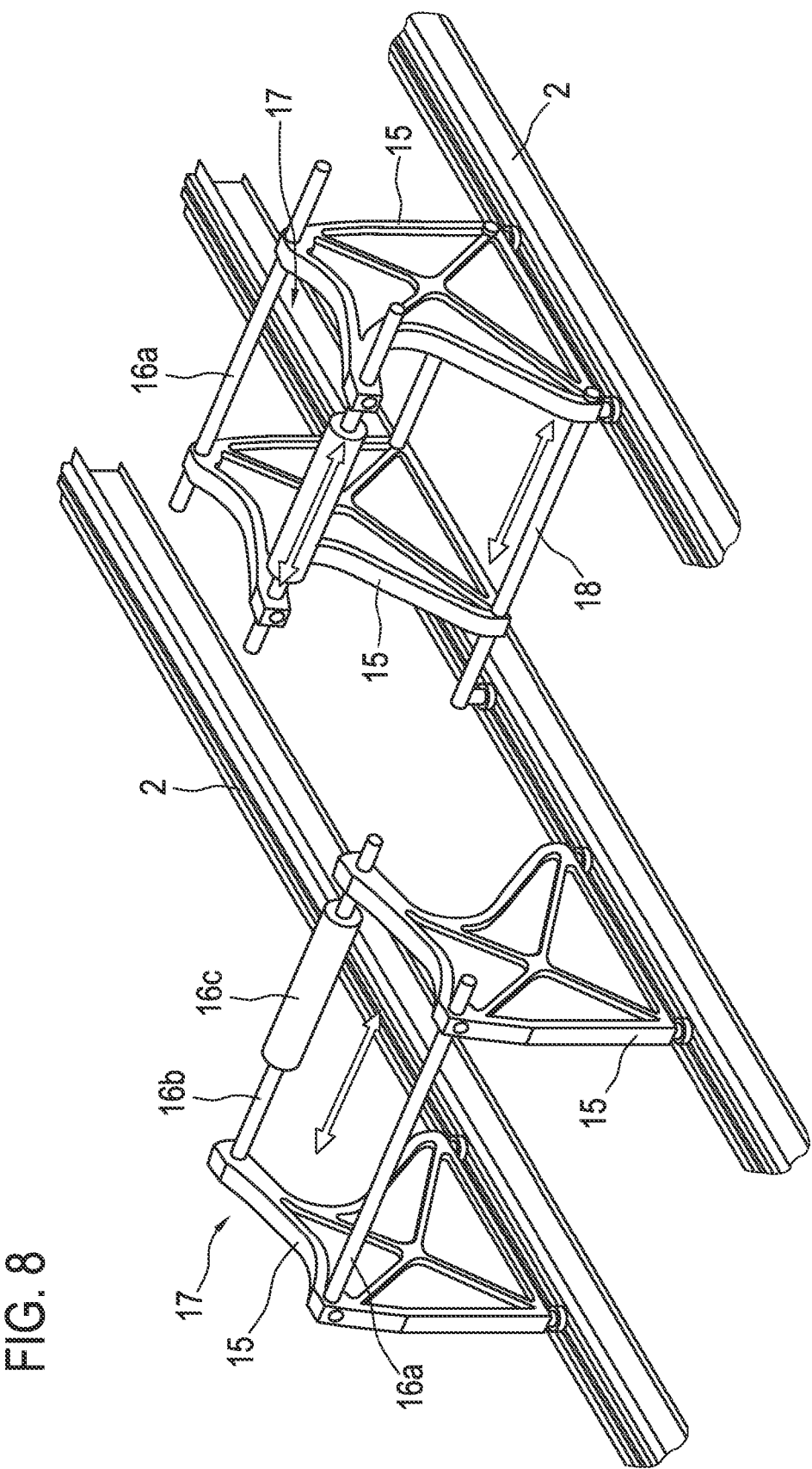
FIG. 8 shows a perspective view, from above, of two seats lying diagonally opposite one another with an embodiment of the seat frame according to the disclosed embodiments.
Figure 9:
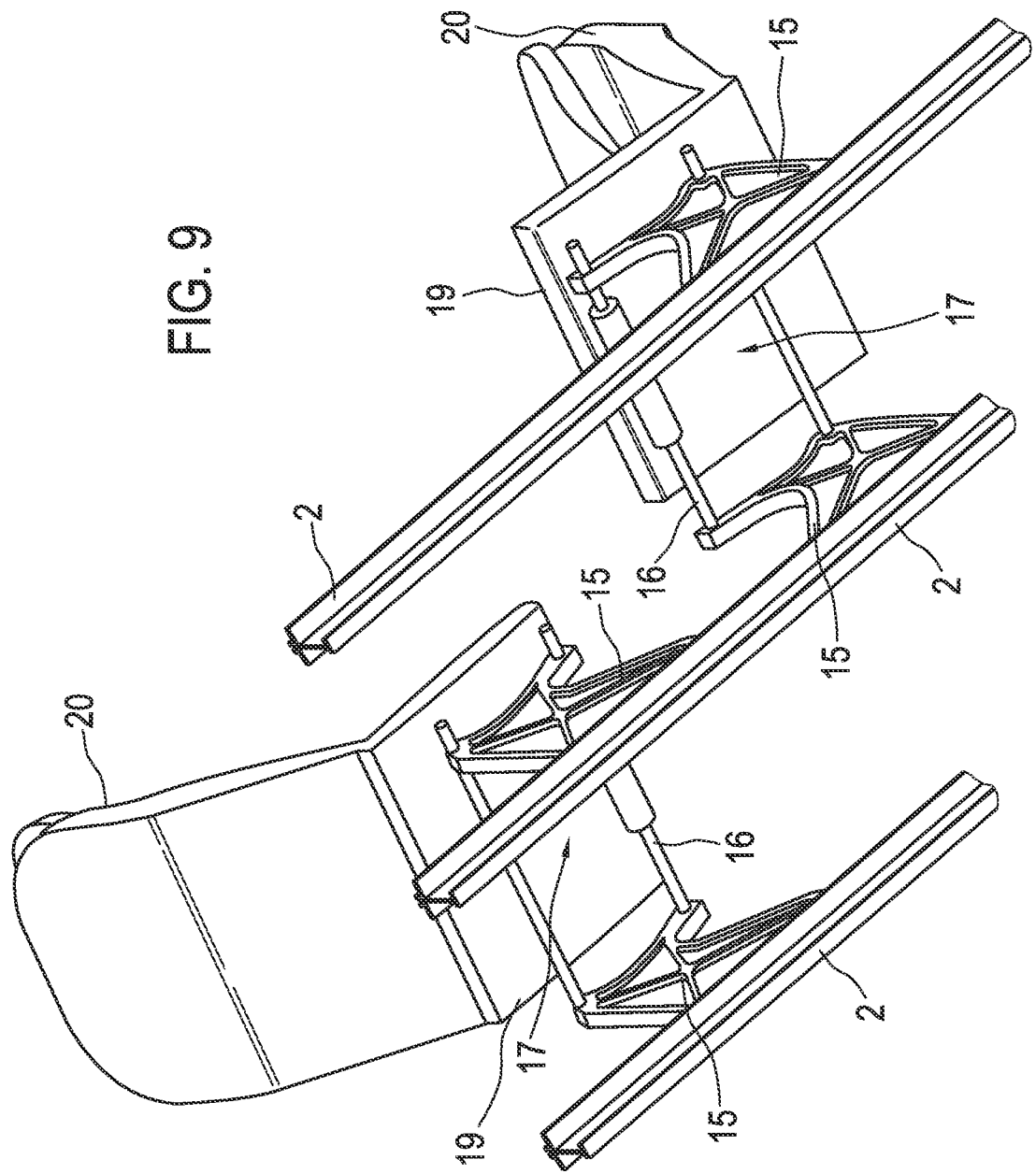
FIG. 9 shows a perspective view, from below, of two seats lying diagonally opposite one another with an embodiment of the seat frame with a mounted seat.
Figure 10:
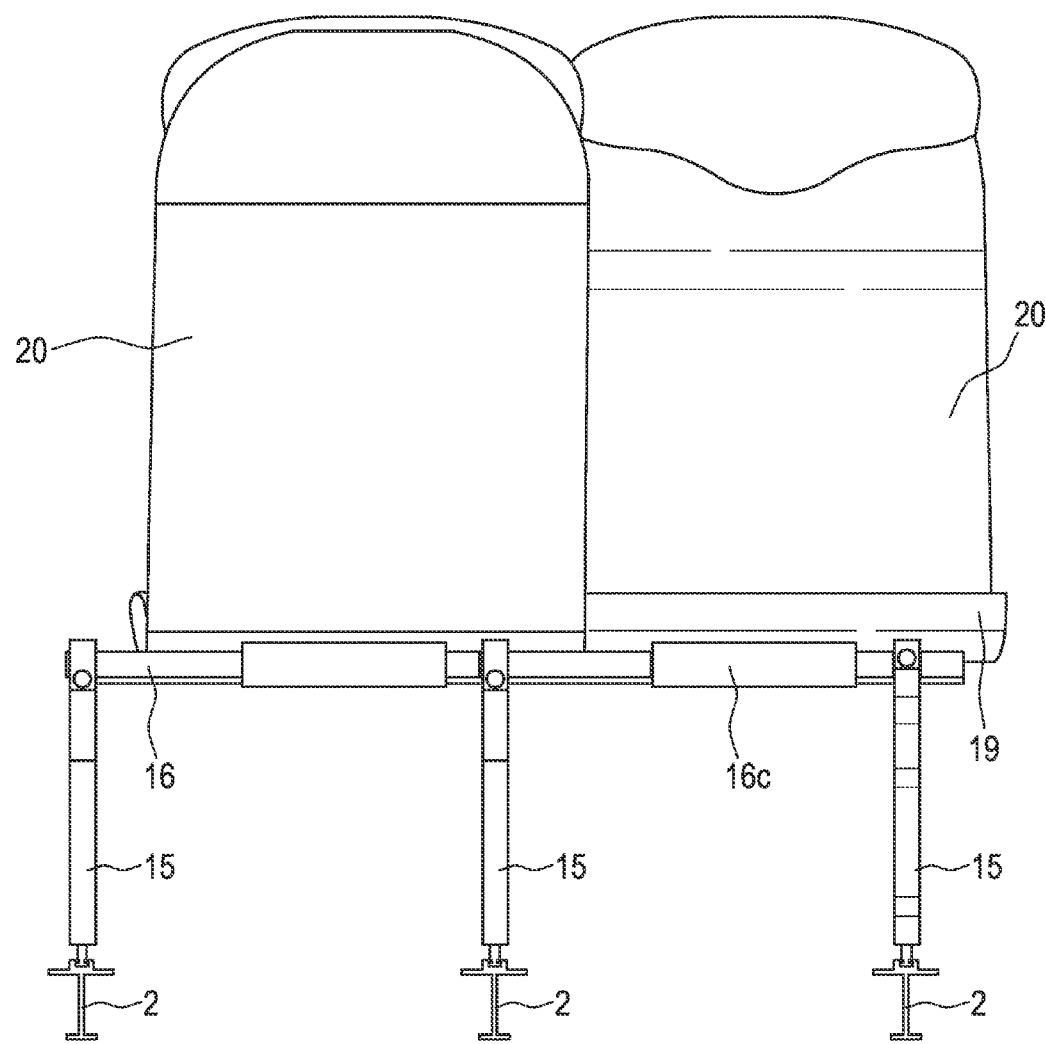
FIG. 10 shows a front view of two seats lying diagonally opposite one another with the embodiment of the seat frame according to the disclosed embodiments.

FIGS. 8 to 10 show an embodiment in which, instead of an adapter plate 7, a linkage is used as a spacing device, in order to ensure the stability of the connection of the two support elements 15.

FIG. 8 shows in perspective view from above three rails 2 running in parallel, on which two seats are mounted which lie diagonally opposite one another. The seats are each mounted an two essentially vertically standing support elements 15. With a view to greater clarity, the actual seats with the seating surface and seat back are omitted in FIG. 8. In the left-hand part of FIG. 8, each support element 15 is mounted directly in one of rails 2. In the embodiment shown, support elements 15 each comprise two fixing feet, with which they engage into mounting rails 2. In the installed state, the fixing feet of a seat therefore form a rectangle. The two support elements 15, which are intended to carry a seat, are connected to one another in the embodiment shown in each case at their upper end by means of a seat brace 16a as a spacing device, in order to ensure that they have a defined spacing from one another. The mounted seat, i.e. seating surface and seat back, can subsequently rest on this seat brace 16a. Apart from a first seat brace 16a, a second seat brace 16b can be provided for a further improvement in the stability of the connection between vertical support elements 15, said second seat brace running parallel to first seat brace 16a also substantially at the height of the seat. Both seat braces 16a and 16b are mounted in a mobile fashion on at least one of support elements 15. For this purpose, there is preferably provided for each seat brace 16a and 16b a hole in support element 15, in which seat brace 16a and 16b can slide more or less friction-free. During assembly, seat brace 16a and 16b is then fixed in the hole for example by means of a clamping screw, and any projecting part of seat brace 16a and 16b is cut off in order to prevent an obstruction at the side of the support element due to seat brace 16a and 16b. The possibility of displacement of seat brace 16a and 16b is indicated in FIG. 8 by a double arrow. With this embodiment of the spacing device, the spacing of support elements 15 can be freely adjusted independently of a seat, without the stability of the seat being restricted.

Seat brace 16b preferably has a roll 16c, on which the seat (not shown) subsequently to be mounted can be slid forwards or backwards, in order for example to adjust the inclination of the seat back by pulling forward or pushing back the seating surface. Seat braces 16a, 16b and optional roll 16c are thus part of a bearing structure 17 for the seat to be mounted. Apart from this bearing structure 17, which already ensures a stable spacing between the support elements, bottom brace 18 as an additional part of the spacing device can be provided to further improve the stability of the seat structure, said bottom brace defining the spacing between support elements 15 in the same way as seat braces 16a, 16b. Moreover, bottom brace 18, which is located substantially at the height of the lower end of support element 15, can itself also be equipped with means (not shown) for the fixing in one of rails 2. This is shown in the right-hand part of FIG. 8. Apart from seat braces 16a and 16b with roll 16c already described in connection with the left-hand part of FIG. 8, a bottom brace 18 is provided here, which ends in one of the two support elements 15. This bottom brace 18 is also arranged in a mobile fashion in support elements 15, which is indicated by a double arrow in FIG. 8, right-hand illustration. Whereas bottom brace 18 ends in one support element 15, it passes through the other of the two support elements 15 (an the left in the right-hand part of FIG. 8) and ends at the height of mounting rail 2. At the height of mounting rail 2, bottom brace 18 is anchored by a fixing element directly in rail 2 and fixed if need be. In contrast with the example of embodiment in the left-hand part of FIG. 8, it is thus possible with the embodiment in the right-hand part of FIG. 8 to select the spacing between support elements 15 completely free from the spacing of mounting rails 2, so that one is no longer bound by the spacing of rails 2.

The example of embodiment in the left-hand part of FIG. 8 with support elements 15 anchored directly in rail 2 is shown once again in a view from below in FIG. 9 for the purpose of further clarification. The four support elements 15 for two seats lying diagonally opposite one another are mounted on the three rails 2. Support elements 15 are connected in pairs by bearing structure 17 to seat braces 16. Lying on bearing structure 17 is a seating element 19, to which a seat back 20 is fitted. As can be seen in FIG. 9, with this embodiment of the modular seat system according to the disclosed embodiments there is the possibility of positioning the seats with seating element 19 and seat back 20 in the lateral direction independently of the spacing of rails 2 from one another. Due to the fact that seat braces 16 for the connection of support elements 15 are fitted at the upper end of support elements 15 in an (at least partially) mobile fashion, the spacing of the support elements can be changed independently of the width of the seat unit. Conversely, the seats can be freely positioned laterally independently of the spacing between the support elements. The fixing elements on the support elements, with which the latter are anchored in rails 2, essentially form a rectangle with a seat nearby.

FIG. 10 once again illustrates the laterally free positioning capability of the seats in a view of the group of seats from in front and from the rear. As can be seen, the two seats in this representation are not symmetrical with respect to middle rail 2, but shifted to the right. Both seating elements 19 rest on respective seat brace 16 and can slide on accompanying roll 16c. A maximum degree of freedom in respect of the positioning of the seats is thus achieved.

Figure 11A:
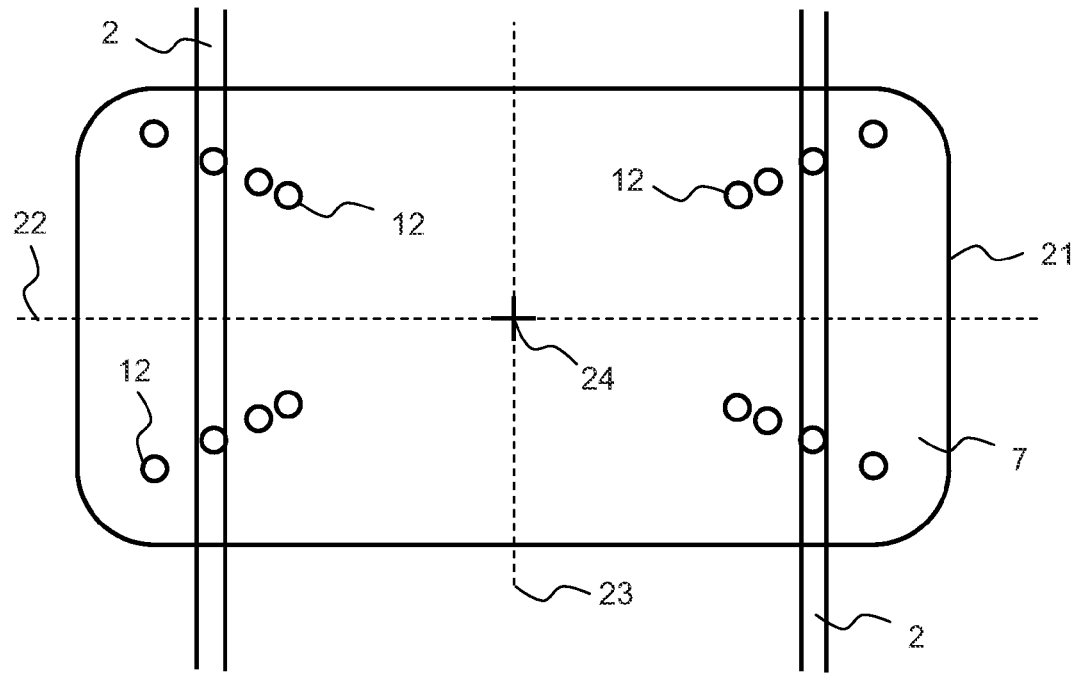
FIG. 11A and FIG. 11B show a plan view of another embodiment of the adapter plate.
Figure 11B:
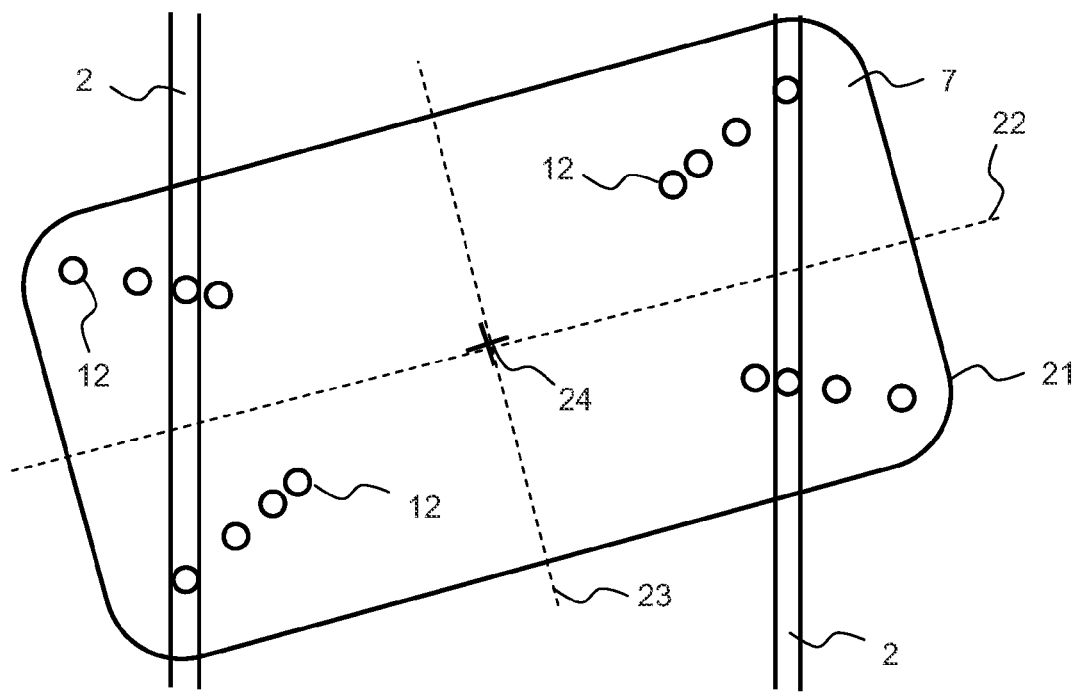

In FIGS. 11A and 11B another embodiment of the adapter plate is shown. This embodiment of the plate is provided with a plurality of fastening holes 12 in a specific pattern. The hole-pattern comprises four groups of holes wherein in each group the holes are arranged on a line that originates from a centre point 24 of the plate 7. The distance between each pair of said multiple holes 12 on the virtual centre line increases with their distance from the centre point 24.

In FIG. 11A the adapter plate is oriented with one of its principal edges 21 being in parallel to the seat rails 2, i.e. in parallel to the flight direction (not shown). Instead of said principal edge 21 the orientation of the plate may also refer to a symmetry axis 22, 23 of plate 7. Whereas the orientation of plate 7 in FIG. 11A provides for the seats (not shown) to be oriented in flight direction, the plate according to the disclosed embodiments also offers an oblique orientation of the seats with respect to the flight direction.

In FIG. 11B the plate is shown in a rotated position. Plate 7 is rotated around its centre point 24 and it is fixed through holes 12 which coincide with the seat rails 2 in its rotated position. The new fixation holes 12 for mounting plate 7 to the seat rails 2 are different from the fixation holes 12 in the basic orientation of plate 7 in FIG. 11A. The only fixed-point of plate 7 in FIG. 11A and FIG. 11B is its centre point 24. In the rotated position plate 7 provides for the seats to be oriented in an oblique arrangement with respect to the flight direction.

It is to be understood however that rotating plate 7 is not limited to rotating it around centre point 24. As a fixed-point 25 also one of the fixation holes 12 can be chosen that is used in the basic orientation. An example of such an arrangement is shown in FIG. 12A and FIG. 12B.

Figure 12A:
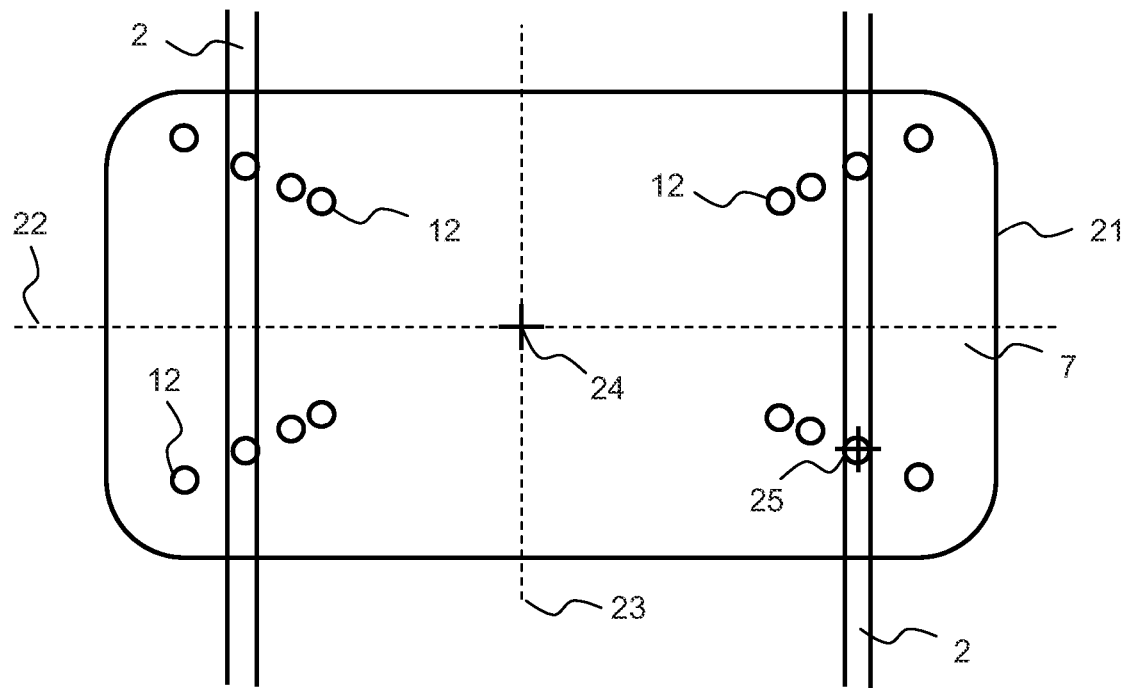
FIG. 12A and FIG. 12B show a plan view of still another embodiment of the adapter plate.

In FIG. 12A like in FIG. 11A plate 7 is oriented with one symmetry axis 22, 23 being in parallel to seat rails 2. Accordingly, the seats (not shown) are oriented in parallel to the flight direction and the fixation of the plate 7 in seat rails 2 is similar to the fixation in FIG. 11A.

Figure 12B:
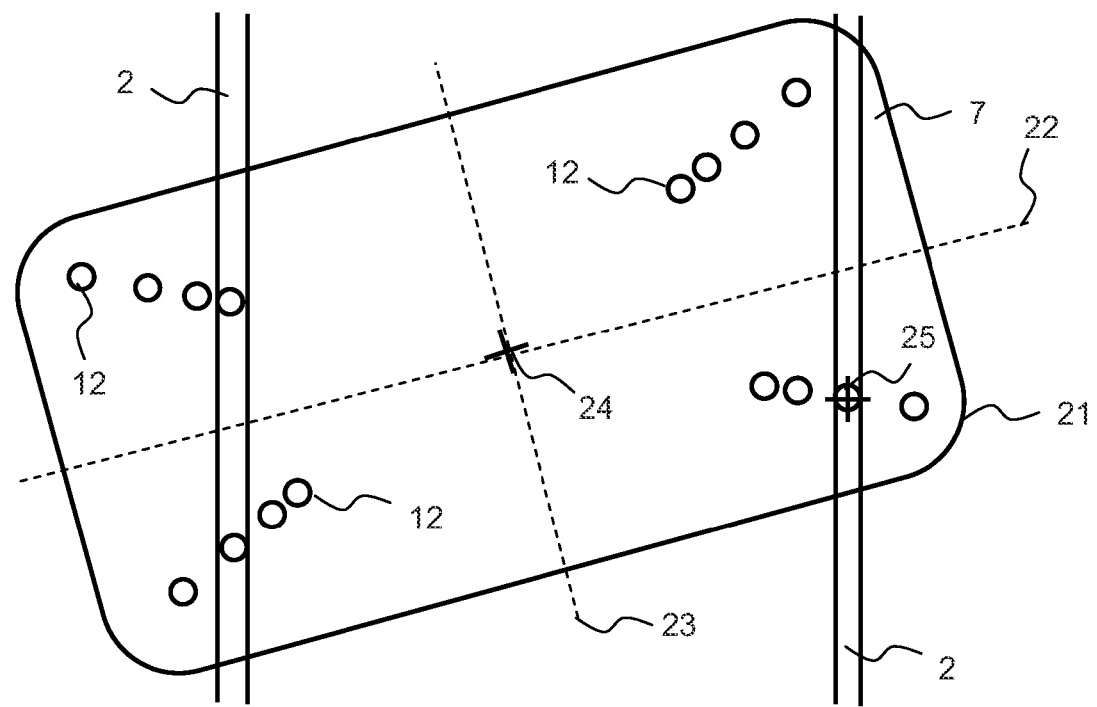

In FIG. 12B plate 7 is rotated around one of the fixation holes 12 that serves as pivot point 25. In the shown example the lower right fixation hole has been chosen as pivot point 25. Rotated around this pivot point 25 the plate ends up with an orientation oblique with respect to the seat rails 2 and additionally is moved to the left having regard to its basic orientation in FIG. 12A.

With a limited number of through-holes 12 in plate 7 the inventors found that the stepwise adjustment of plate 7 in steps of e.g. 5 degrees is readily realised. E.g. with only 7 holes per group a 30° range of seat orientations is feasible without necessitating a complete retrofit of the plate or the seats. It should be understood however that the holes need not be located on a line that originates from the centre point 21 as shown in FIGS. 11A, 11B, 12A and 12B but it is possible as well to arrange the holes in another pattern, e.g. with the holes 12 on lines in parallel to symmetry axis 22.

REFERENCE NUMBERS 1. (cabin) installation module
2. mounting rail, 2' alternative rail
3. cabin floor
4. (floor) bearing profile
5. transverse spar
6. rib
7. adapter plate
8. clamping element, 8' variant
9. guide pin, 9' variant
10. rail opening (upwards; hole)
11. fixing point installation module
12. hole, 12' variant
13. slot, 13' first variant, 13" second variant
14. transverse rail on adapter plate
15. support element
16. seat brace, 16a first seat brace, 16b second seat brace, 16c reinforcement
17. bearing structure
18. bottom brace
19. seating element
20. seat back
a. rail spacing, a1, . . . , a4 variants
t. pitch of rail openings
bi, b2 spacing of holes and slots (on one side of adapter plate)
21. principal edge
22, 23. symmetry axis
24. centre point
25. fixed-point, pivot point

The invention claimed is:

1. A modular seat system for a passenger compartment of a vehicle with at least one seat, which comprises:
   a seat unit with a seating element and a seat back and
   a seat frame with at least one pair of essentially vertical support elements, at whose upper end a bearing structure is arranged on which the seat unit rests,
   a fixing structure in the floor of the passenger compartment with at least two longitudinal rails, which have a predetermined spacing from one another, for accommodating the lower ends of the support elements, and
   an adapter plate for fixing of the support elements, which adapter plate is fitted to the lower end of the support elements, and is fitted in a mobile fashion to at least one support element, so that the spacing of the support elements from one another is variable independently of the width of the seat unit;
   wherein the adapter plate comprises one or more guide pins for positioning of the plate or clamping elements for fixing of the plate in at least one rail, which guide pins and clamping elements, respectively, are secured to the adapter plate at locations laterally displaced from locations of the support elements.

2. The modular seat system according to claim 1, wherein the adapter plate comprises fixing points at the plate upper side for installation modules.

3. The modular seat system according to claim 1, wherein the guide pins and/or the clamping elements are mounted on the plate so as to be displaceable.

4. The modular seat system according to claim 1, wherein the adapter plate has holes for the fitting of the guide pins and/or slots for the fitting of the clamping elements.

5. The modular seat system according to claim 4, wherein the spacing between the holes corresponds to the rail spacings.

6. The modular seat system according to claim 4, wherein at least two of the slots are arranged in the adapter plate perpendicular with respect to the rails.

7. The modular seat system according to claim 4, wherein the slot length substantially corresponds to half the pitch of the rail openings.

8. The modular seat system according to claim 1, wherein the adapter plate has at least four clamping elements and two guide pins.

9. The modular seat system according to claim 1, wherein the adapter plate has two clamping elements and guide pins, two or more such plates being used for the fixing of an installation module.

10. The modular seat system according to claim 1 wherein the adapter plate is a light metal milled part, a plastics part or a high-strength casting.

11. The modular seat system according to claim 1, wherein the adapter plate has a plurality of holes for the fixing of the plate in at least one rail in a predetermined angle to the flight direction.

12. The modular seat system according to claim 11, wherein the adapter plate has at least one transverse rail running at the predetermined angle to the flight direction.

* * * * *